United States Patent
Pickerd et al.

(10) Patent No.: US 11,940,889 B2
(45) Date of Patent: Mar. 26, 2024

(54) COMBINED TDECQ MEASUREMENT AND TRANSMITTER TUNING USING MACHINE LEARNING

(71) Applicant: Tektronix, Inc., Beaverton, OR (US)

(72) Inventors: John J. Pickerd, Hillsboro, OR (US); Kan Tan, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 17/877,829

(22) Filed: Jul. 29, 2022

(65) Prior Publication Data

US 2023/0050303 A1 Feb. 16, 2023

Related U.S. Application Data

(60) Provisional application No. 63/232,378, filed on Aug. 12, 2021.

(51) Int. Cl.
*G06F 11/27* (2006.01)
*G06F 1/02* (2006.01)
*G06F 11/22* (2006.01)

(52) U.S. Cl.
CPC .............. *G06F 11/27* (2013.01); *G06F 1/022* (2013.01); *G06F 11/2273* (2013.01)

(58) Field of Classification Search
CPC .... G06F 11/2733; G06F 11/267; G06F 11/27; G06F 1/022; G06F 11/2273
See application file for complete search history.

(56) References Cited

U.S. PATENT DOCUMENTS 5,272,723 A 12/1993 Kimoto
5,397,981 A 3/1995 Wiggers
(Continued)

FOREIGN PATENT DOCUMENTS

CN 107342810 11/2019
EP 2743710 9/2018
(Continued)

OTHER PUBLICATIONS

S. Varughese, A. Melgar, V. A. Thomas, P. Zivny, S. Hazzard and S. E. Ralph, "Accelerating Assessments of Optical Components Using Machine Learning: TDECQ as Demonstrated Example," in Journal of Lightwave Technology, vol. 39, No. 1, pp. 64-72, 1 Jan. 1, 2021 (Year: 2021).*
(Continued)

*Primary Examiner* — Matthew M Kim
*Assistant Examiner* — Indranil Chowdhury
(74) *Attorney, Agent, or Firm* — Miller Nash LLP; Andrew J. Harrington (57) ABSTRACT

A test and measurement system has a test and measurement instrument, a test automation platform, and one or more processors, the one or more processors configured to execute code that causes the one or more processors to receive a waveform created by operation of a device under test, generate one or more tensor arrays, apply machine learning to a first tensor array of the one or more tensor arrays to produce equalizer tap values, apply machine learning to a second tensor array of the one of the one or more tensor arrays to produce predicted tuning parameters for the device under test, use the equalizer tap values to produce a Transmitter and Dispersion Eye Closure Quaternary (TDECQ) value, and provide the TDECQ value and the predicted tuning parameters to the test automation platform. A method of testing devices under test includes receiving a waveform created by operation of a device under test, generating one or more tensor arrays, applying machine learning to a first tensor array of the one or more tensor arrays to produce equalizer tap values, applying machine learning to a second tensor array of the one or more tensor arrays to produce predicted tuning parameters for the device under test, using the equalizer tap values to produce a Transmitter Dispersion
(Continued)

Eye Closure Quaternary (TDECQ) value, and providing the TDECQ value and the predicted tuning parameters to a test automation platform.

20 Claims, 5 Drawing Sheets

(56) References Cited

U.S. PATENT DOCUMENTS

| | | | |
|---|---|---|---|
| 5,594,655 A | 1/1997 | Berchin | |
| 7,181,146 B1 | 2/2007 | Yorks | |
| 7,298,463 B2 | 11/2007 | French | |
| 8,583,395 B2 | 11/2013 | Dybsetter | |
| 8,861,578 B1 | 10/2014 | Lusted | |
| 9,059,803 B2 | 6/2015 | Detofsky | |
| 9,337,993 B1 | 5/2016 | Lugthart | |
| 9,548,858 B1 | 1/2017 | Cirit | |
| 9,699,009 B1 | 7/2017 | Ainspan | |
| 10,171,161 B1 | 1/2019 | Cote | |
| 10,236,982 B1 | 3/2019 | Zhuge | |
| 10,270,527 B1 | 4/2019 | Mentovich | |
| 10,396,897 B1 | 8/2019 | Malave | |
| 10,585,121 B2 | 3/2020 | Absher | |
| 10,727,973 B1 | 7/2020 | Kumar | |
| 10,852,323 B2 | 12/2020 | Schaefer | |
| 10,863,255 B2 | 12/2020 | Zhang | |
| 11,005,697 B2 | 5/2021 | Liston | |
| 11,040,169 B2 | 6/2021 | Jung | |
| 11,095,314 B2 | 8/2021 | Medard | |
| 11,177,986 B1 | 11/2021 | Ganesan | |
| 11,233,561 B1 | 1/2022 | O'Shea | |
| 11,237,190 B2 | 2/2022 | Rule | |
| 11,336,378 B2 | 5/2022 | Buttoni | |
| 11,388,081 B1 | 7/2022 | Sommers | |
| 11,476,967 B2 | 10/2022 | Geng | |
| 11,646,863 B2* | 5/2023 | Balan | H04L 25/03878 |
| | | | 375/354 |
| 11,695,601 B2 | 7/2023 | Sudhakaran | |
| 2002/0063553 A1 | 5/2002 | Jungerman | |
| 2003/0053170 A1 | 3/2003 | Levinson | |
| 2003/0220753 A1 | 11/2003 | Pickerd | |
| 2004/0032889 A1 | 2/2004 | Hikada | |
| 2004/0121733 A1 | 6/2004 | Peng | |
| 2004/0131365 A1 | 7/2004 | Lee | |
| 2004/0136422 A1 | 7/2004 | Mahowald | |
| 2004/0165622 A1 | 8/2004 | Lu | |
| 2004/0236527 A1 | 11/2004 | Felps | |
| 2005/0222789 A1 | 10/2005 | West | |
| 2005/0246601 A1 | 11/2005 | Waschura | |
| 2005/0249252 A1 | 11/2005 | Sanchez | |
| 2006/0120720 A1 | 6/2006 | Hauenschild | |
| 2021/0111794 A1 | 6/2006 | Huang | |
| 2008/0126001 A1* | 5/2008 | Murray | G01R 31/31915 |
| | | | 702/185 |
| 2008/0159737 A1 | 7/2008 | Noble | |
| 2008/0212979 A1 | 9/2008 | Ota | |
| 2009/0040335 A1 | 2/2009 | Ito | |
| 2011/0085793 A1 | 4/2011 | Oomori | |
| 2011/0161738 A1 | 6/2011 | Zhang | |
| 2011/0286506 A1* | 11/2011 | Libby | G01R 35/005 |
| | | | 375/224 |
| 2013/0046805 A1 | 2/2013 | Smith | |
| 2014/0093233 A1 | 4/2014 | Gao | |
| 2014/0343883 A1* | 11/2014 | Libby | G01R 13/02 |
| | | | 702/68 |
| 2015/0003505 A1 | 1/2015 | Lusted | |
| 2015/0055694 A1 | 2/2015 | Juenemann | |
| 2015/0207574 A1 | 7/2015 | Schoen | |
| 2016/0191168 A1 | 6/2016 | Huang | |
| 2016/0328501 A1* | 11/2016 | Chase | G06F 30/367 |
| 2018/0006721 A1 | 1/2018 | Ishizaka | |
| 2018/0074096 A1 | 3/2018 | Absher | |
| 2018/0204117 A1* | 7/2018 | Brevdo | G06N 3/044 |
| 2019/0038387 A1 | 2/2019 | Chu | |
| 2019/0278500 A1 | 9/2019 | Lakshmi | |
| 2019/0332941 A1* | 10/2019 | Towal | G06N 3/045 |
| 2019/0370158 A1 | 12/2019 | Rivoir | |
| 2019/0370631 A1* | 12/2019 | Fais | G06N 3/045 |
| 2020/0035665 A1 | 1/2020 | Chuang | |
| 2020/0057824 A1 | 2/2020 | Yeh | |
| 2020/0166546 A1* | 5/2020 | O'Brien | G01R 13/029 |
| 2020/0195353 A1 | 6/2020 | Ye | |
| 2020/0229206 A1 | 7/2020 | Badic | |
| 2020/0313999 A1 | 10/2020 | Lee | |
| 2020/0335029 A1 | 10/2020 | Gao | |
| 2021/0041499 A1 | 2/2021 | Ghosal | |
| 2021/0105548 A1 | 4/2021 | Ye | |
| 2021/0160109 A1 | 5/2021 | Seol | |
| 2021/0167864 A1* | 6/2021 | Razzell | H04B 10/25133 |
| 2021/0314081 A1 | 10/2021 | Shattil | |
| 2021/0389373 A1* | 12/2021 | Pickerd | G01R 31/31708 |
| 2021/0390456 A1 | 12/2021 | Pickerd | |
| 2022/0070040 A1 | 3/2022 | Namgoong | |
| 2022/0076715 A1 | 3/2022 | Lee | |
| 2022/0121388 A1 | 4/2022 | Woo | |
| 2022/0182139 A1 | 6/2022 | Zhang | |
| 2022/0199126 A1 | 6/2022 | Lee | |
| 2022/0200712 A1 | 6/2022 | Lillie | |
| 2022/0215865 A1 | 7/2022 | Woo | |
| 2022/0236326 A1 | 7/2022 | Schaefer | |
| 2022/0239371 A1 | 7/2022 | Xu | |
| 2022/0247648 A1 | 8/2022 | Pickerd | |
| 2022/0311513 A1* | 9/2022 | Pickerd | H04B 10/40 |
| 2022/0311514 A1* | 9/2022 | Smith | H04B 10/0777 |
| 2022/0334180 A1 | 10/2022 | Pickerd | |
| 2022/0373597 A1 | 11/2022 | Agoston | |
| 2022/0373598 A1* | 11/2022 | Tan | G01R 31/31935 |
| 2022/0385374 A1 | 12/2022 | Arikawa | |
| 2022/0390515 A1* | 12/2022 | Pickerd | G01R 31/318307 |
| 2022/0407595 A1* | 12/2022 | Varughese | H04B 10/0731 |
| 2023/0050162 A1* | 2/2023 | Tan | H04B 17/3912 |
| 2023/0052588 A1 | 2/2023 | Sudhakaran | |
| 2023/0088409 A1 | 3/2023 | Parsons | |
| 2023/0098379 A1* | 3/2023 | Smith | G06N 3/02 |
| | | | 706/12 |
| 2023/0228803 A1* | 7/2023 | Sun | G06N 3/08 |
| | | | 324/537 |
| 2023/0306578 A1* | 9/2023 | Pickerd | G06T 7/0008 |
| | | | 382/141 |

FOREIGN PATENT DOCUMENTS

| | | | | |
|---|---|---|---|---|
| EP | 3936877 A1 * | 1/2022 | | G01R 31/31905 |
| JP | 6560793 | 8/2019 | | |
| WO | 2021092156 | 5/2021 | | |
| WO | 2022171645 | 8/2022 | | |
| WO | 2022189613 | 9/2022 | | |

OTHER PUBLICATIONS

Varughese, Siddarth, et al., Accelerating Assessments of Optical Components Using Machine Learning: TDECQ as Demonstrated Example, Journal of Lightwave Technology, Jan. 1, 2021, pp. 64-72, vol. 39, No. 1, IEEE.

Varughese, Siddarth, et al., Accelerating TDECQ Assessments using Convolutional Neural Networks, OFC, Mar. 2020, 3 pages, The Optical Society (OSA).

Watts et al., "Performance of Single-Mode Fiber Links Using Electronic Feed-Forward and Decision Feedback Equalizers", 2005, IEEE Photonics Techology Letters, vol. 17, No. 10, pp. 2206-2208 (Year: 2005).

Echeverri-Chacon et al., "Transmitter and Dispersion Eye Closure Quaternary (TDECQ) and Its Sensitivity to Impairments in PAM4 Waveforms", 2019, Journal of Lightwave Technology, vol. 37, No. 3, pp. 852-860 (Year: 2019).

Wang et al., "Intelligent Constellation Diagram Analyzer Using Convolutional Neural Network-Based Deep Learning," Optics Express, Jul. 24, 2017, vol. 25, No. 15.

* cited by examiner

COMBINED TDECQ MEASUREMENT AND TRANSMITTER TUNING USING MACHINE LEARNING

CROSS-REFERENCE TO RELATED APPLICATIONS

This disclosure claims benefit of U.S. Provisional Application No. 63/232,378, titled "COMBINED TDECQ AND TRANSMITTER TUNING MACHINE LEARNING SYSTEM," filed on Aug. 12, 2021, the disclosure of which is incorporated herein by reference in its entirety.

TECHNICAL FIELD

This disclosure relates to test and measurement systems, and more particularly to systems for component tuning and performance measurements.

BACKGROUND

Machine learning techniques can significantly improve the speed of complex measurements, such as Transmitter Dispersion Eye Closure Quaternary (TDECQ) measurements, for example. The measurement speed improvements translate to the improvement of production throughput on a manufacturing line, for example.

Saving time on the manufacturing line for testing and validation of the performance of devices under test (DUT) can save tens of thousands of dollars.

DETAILED DESCRIPTION

Testing a device under test (DUT) using machine learning may involve an iterative process in which the DUT receives a set of tuning parameters. When the DUT operates using that set of tuning parameters, it produces results for measurement against a value or range of values that determine if the device passes or fails. The below discussion may employ examples of tuning and testing an optical transmitter or transceiver to provide a contextual example. The embodiments here apply to any DUT that undergoes a testing process to determine whether the DUT operates as needed to pass.

Figure 1:
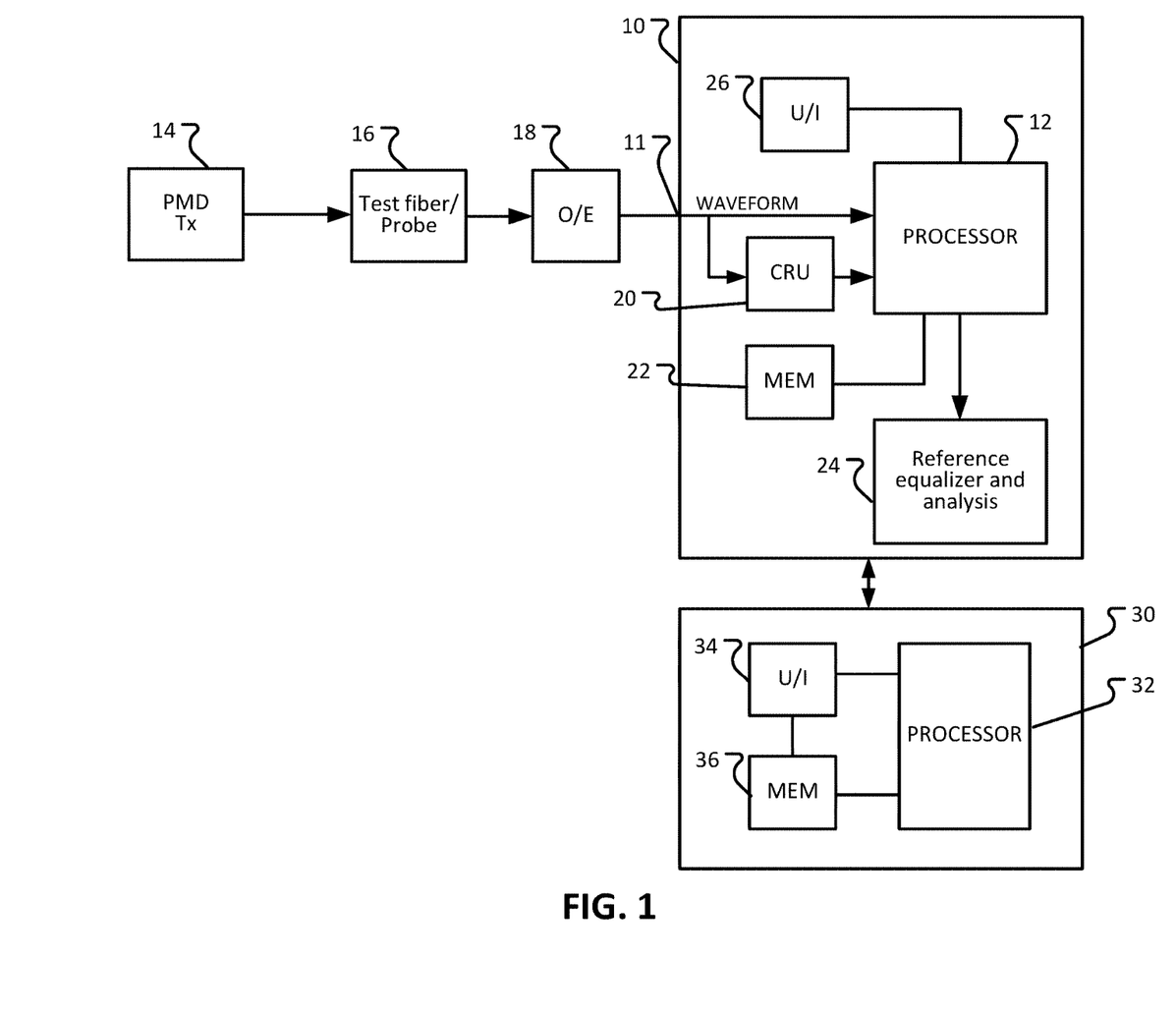
FIG. 1 shows an embodiment of a test and measurement system.

FIG. 1 shows an embodiment of a testing setup in the instance of an optical transmitter 14 as a DUT. The testing setup includes a test and measurement system that may include a test and measurement instrument such as an oscilloscope 10 and a test automation platform 30. The test automation platform 30 may reside on a manufacturing line to perform pass/fail analysis of the DUTs. The test and measurement instrument 10 receives an electrical signal from the DUT 14 at an input 11, typically through an instrument probe 16. In the case of an optical transmitter, the probe will typically comprise a test fiber coupled to an optical to electrical converter 18 that provides the electrical signal to the test and measurement instrument to be sampled, digitized, and acquired as a waveform that represents the signal from the DUT. A clock recovery unit (CRU) 20 may recover the clock signal from the waveform data, if the test and measurement instrument 10 comprises a sampling oscilloscope for example. The test and measurement instrument has one or more processors represented by processor 12, a memory 22 and a user interface 26. The memory may store executable instructions in the form of code that, when executed by the processor, causes the processor to perform tasks. The memory may also store the acquired waveform. The user interface 26 of the test and measurement instrument allows a user to interact with the instrument 10, such as to input settings, configure tests, etc. The reference equalizer and analysis module 24 may play a role in equalizing the signal.

Alternatively, or in addition to, the user interface on the test and measurement instrument, the user interface 34 on the test automation platform 30 may allow the user to configure the test and measurement instrument, as well as provide settings and other information for the test automation platform and the overall system. The test automation platform may comprise a piece of testing equipment or other computing device. While the platform may reside on a manufacturer's production line, no limitation to any particular location or use in any particular situation is intended nor should be implied. The test automation platform may also include one or more processors represented by 32 and a memory 36. As discussed in more detail further, the one or more processors 12 on the test and measurement device 10, and the one or more processors 32 on the test automation platform 30, may work in concert to distribute tasks, or one or the other device's processor(s) may perform all of the tasks. The machine learning network discussed below may take the form of one of these processors being configured to operate one or more of the machine learning networks.

Embodiments of the disclosure may comprise a configuration implemented into a standalone software application, referred to in the following discussion as "ML Tools." The test automation system operates a test automation application as the primary system controller in the loop. It sends operating, or tuning, parameters to the DUT and controls the temperature. In the instance of the DUT being an optical transceiver, the parameters comprise transmission parameters. This approach may be found in U.S. patent application Ser. No. 17/701,186, "TRANSCEIVER TUNING USING MACHINE LEARNING," filed Mar. 22, 2022, incorporated here by reference in its entirety. The test automation application also synchronizes the instrument waveform acquisition with the transmission/operating parameter update. In addition, it provides the transmission/operating parameter values to the ML Tools software, and it reads next guess parameter values back from the neural network. The neural network estimates results based on the waveform acquired from the scope.

The machine learning assisted parameter tuning system has two modes of operation: training and runtime. During the training process, the test automation application sends a set of parameters to the DUT and acquires a resulting waveform. The user will be sweeping the parameters to allow the machine to learn what waveforms look like for all parameter settings. The test automation block then feeds a large set of waveforms and parameters to the ML Tools as datasets for training the machines, which also may be referred to as machine learning networks.

During runtime, the trained machines create an estimate for optimized equalization filter taps, usually Feed-Forward Equalization (FFE) taps for the waveform, and for creating an observed parameter set. Application of the FFE taps equalize the input waveform. The TDECQ computation process then uses the equalized waveform as an input. The TDECQ process will typically not use machine learning to obtain TDECQ, but rather computes it using existing measurement processes.

Figure 2:
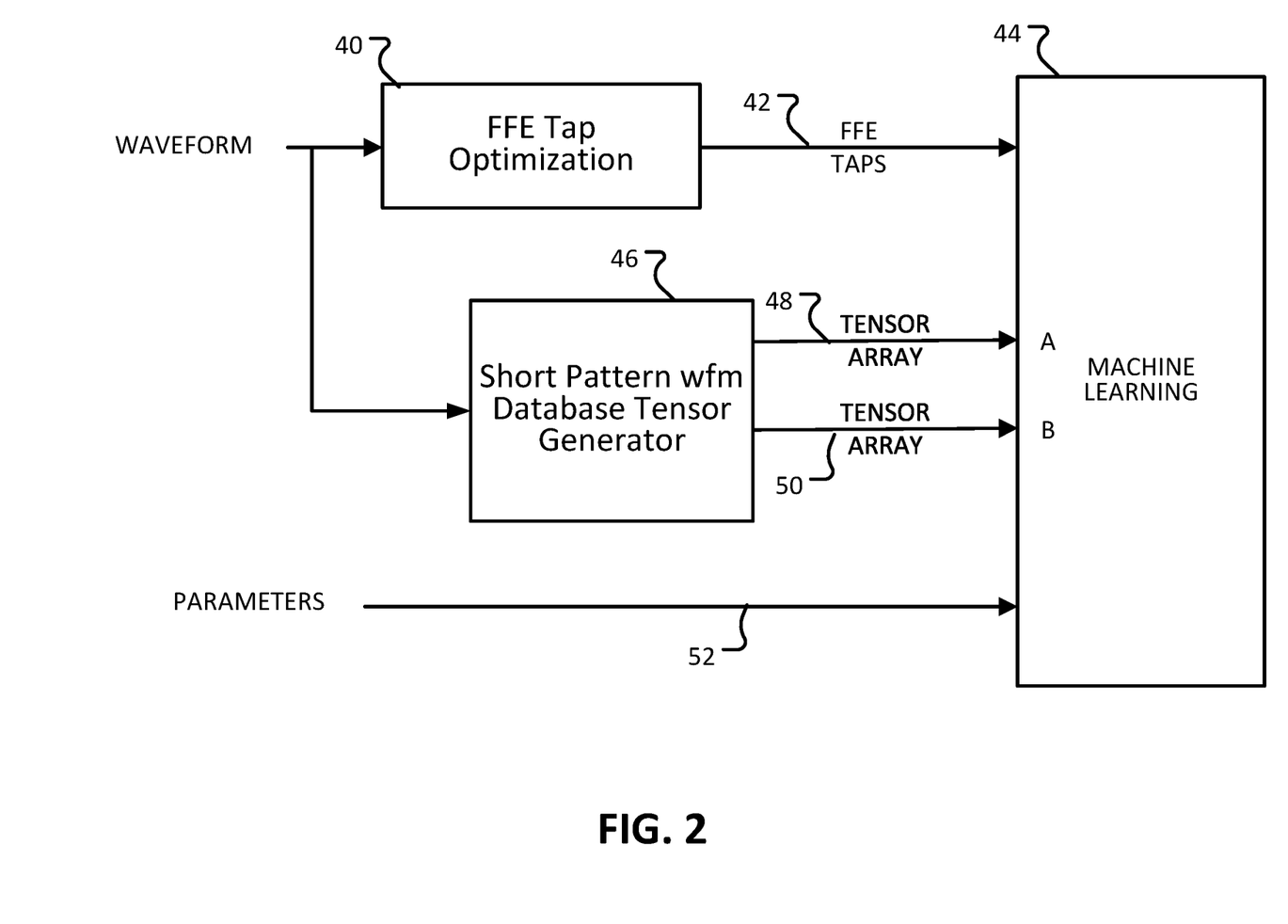
FIG. 2 shows an embodiment of training a single machine learning network within a test and measurement system.

FIG. 2 show an embodiment of training of a single machine. The FFE tap optimization block 40 may use pre-existing software code to optimize and find the optimal FFE taps 42 for the training waveform to be sent to the machine learning network 44. In this embodiment, the training of the machine associates a waveform tensor array with parameters and with optimal FFE taps. The parameters 52 may be optical transmitter or other operating parameter values stored in the DUT from which the waveform was acquired. The tensor array may be as described in U.S. patent application Ser. No. 17/747,954, "SHORT PATTERN WAVEFORM DATABASE BASED MACHINE LEARNING FOR MEASUREMENT," filed May 18, 2022, and/or U.S. patent application Ser. No. 17/592,437, "EYE CLASSES SEPARATOR WITH OVERLAY, AND COMPOSITE, AND DYNAMIC EYE-TRIGGER FOR HUMANS AND MACHINE LEARNING," filed Feb. 3, 2022, the contents of which are hereby incorporated by reference. The short pattern waveform database tensor generator 46 generates one or more tensor arrays. In the embodiments here, the tensor generator generates two sets of tensor arrays 48 and 50. The term "tensor array" as used here means an array of tensor images. Tensor array 48 may comprise a tensor array, each tensor image in the array having one or more waveforms used in determining FFE taps for the TDECQ computation process discussed in the runtime operation below. Tensor array 50 may comprise a tensor array having one array of tensor images, each tensor image having three or more waveforms used in the tuning parameters process discussed in the runtime operation below. Each tensor image in the tensor array may also include a depiction of an environmental parameter to associate with the three or more waveforms, such as a bar graph representing the temperature at which the waveforms were acquired.

The TDECQ process will typically use existing methods for measuring TDECQ. It takes an input waveform and equalizes it with the optimized taps. It then performs the necessary steps internally to measure TDECQ and output that value. It returns that value to the test automation application for evaluation as to pass/fail.

Figure 3:
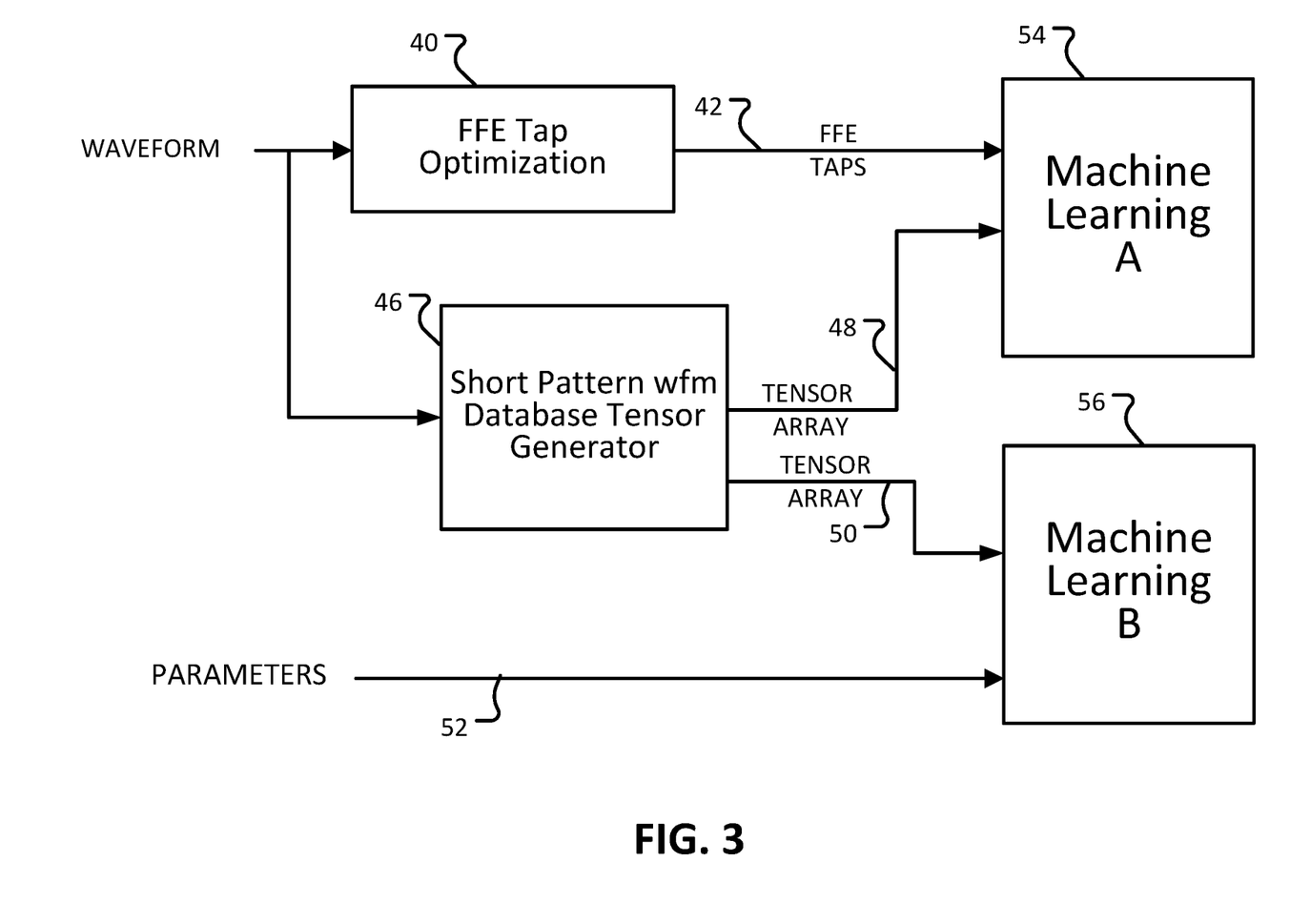
FIG. 3 shows an embodiment of training two machine learning networks within a test and measurement system.

FIG. 3 shows a similar training embodiment to that of FIG. 2. This embodiment has a machine A and a machine B. Machine A is dedicated specifically to associating the tensor array with the optimized FFE taps. Machine A 54 receives the optimized FFE taps 42 from the FFE tap optimization block 40 and a first tensor array 48 comprising one array of tensor images from the short pattern waveform tensor generator 46. The one array may have one waveform per tensor image in the array. Machine B 56 is dedicated specifically to associating parameters with the tensor array. Machine B receives a second tensor array 50 comprising one array of tensor images, each tensor in the array having three waveforms. Machine B also receives the operating parameters 52 associated with the waveforms used to generate the tensor array 50. The various components used in training have the identifier "training" to differentiate them from their runtime counterparts. The waveform comprises a "training waveform," the FFE taps are the "training FFE taps," etc.

Runtime has the objective to tune the optical transmitters, in this example, on a test automation platform. As discussed above, this may comprise a manufacturing test automation platform running on manufacturer's production line. The test automation application controls the overall system, sets up the DUT with parameters, and sets up a test and measurement instrument to acquire the DUT waveform. The test automation application sends the waveform and parameters over to the tuning system. The system observes the waveform and determines if that set of parameters resulted in an optimal waveform that passes limits on the TDECQ value. If it does not, then the system feeds back a new set of parameters to the test automation application that loads them into the DUT for another try. DUTs that have values for TDECQ that are within the desired parameters pass and are considered optimized.

Figure 4:
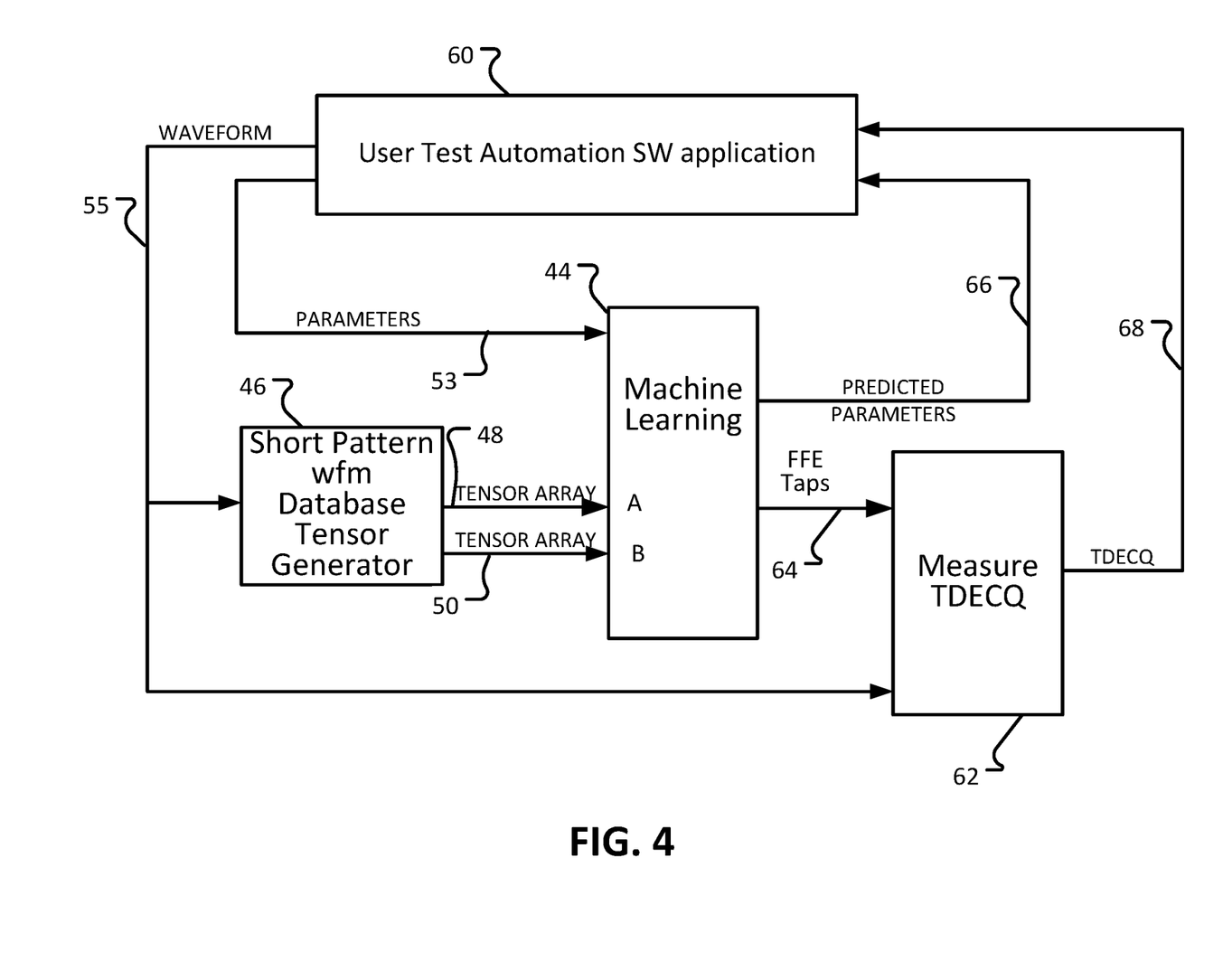
FIG. 4 shows an embodiment of performing TDECQ testing and providing tuning parameters using a single machine learning network within a test and measurement system.

FIG. 4 shows an embodiment of a runtime configuration using a single machine learning network. The test automation application 60 receives the waveform 55, for example, acquired from the DUT by the test and measurement instrument 10 in FIG. 1, and provides the waveform to the short pattern waveform database tensor generator 46 and to the TDECQ measurement process 62. The test automation application 60 also outputs a set of parameters 53 and sends them to the trained machine learning network 44. The machine learning network 44 receives the tensor arrays from the tensor generator 46. The machine learning network 44 uses the tensor array 50, having tensor images using three waveforms images to generate predicted parameters 66 and returns them to the test automation application. The machine learning network 44 may also use the parameters 53, which may include, for example, a temperature at which the waveform 55 was acquired, to generate the predicted parameters 66. Machine learning network 44 receives the tensor array 48 comprising a single array of tensor images, each tensor in the array using one waveform, and provides predicted FFE taps 64 to the TDECQ process 62. The TDECQ process uses the FFE taps 64 to equalize the waveform 55, computes the TDECQ value for the equalized waveform, and sends the TDECQ value 68 to the test automation application. If the TDECQ value meets the criteria, tuning finishes. If the TDECQ value does not pass, the test automation application uses the predicted parameters on the next testing iteration.

Figure 5:
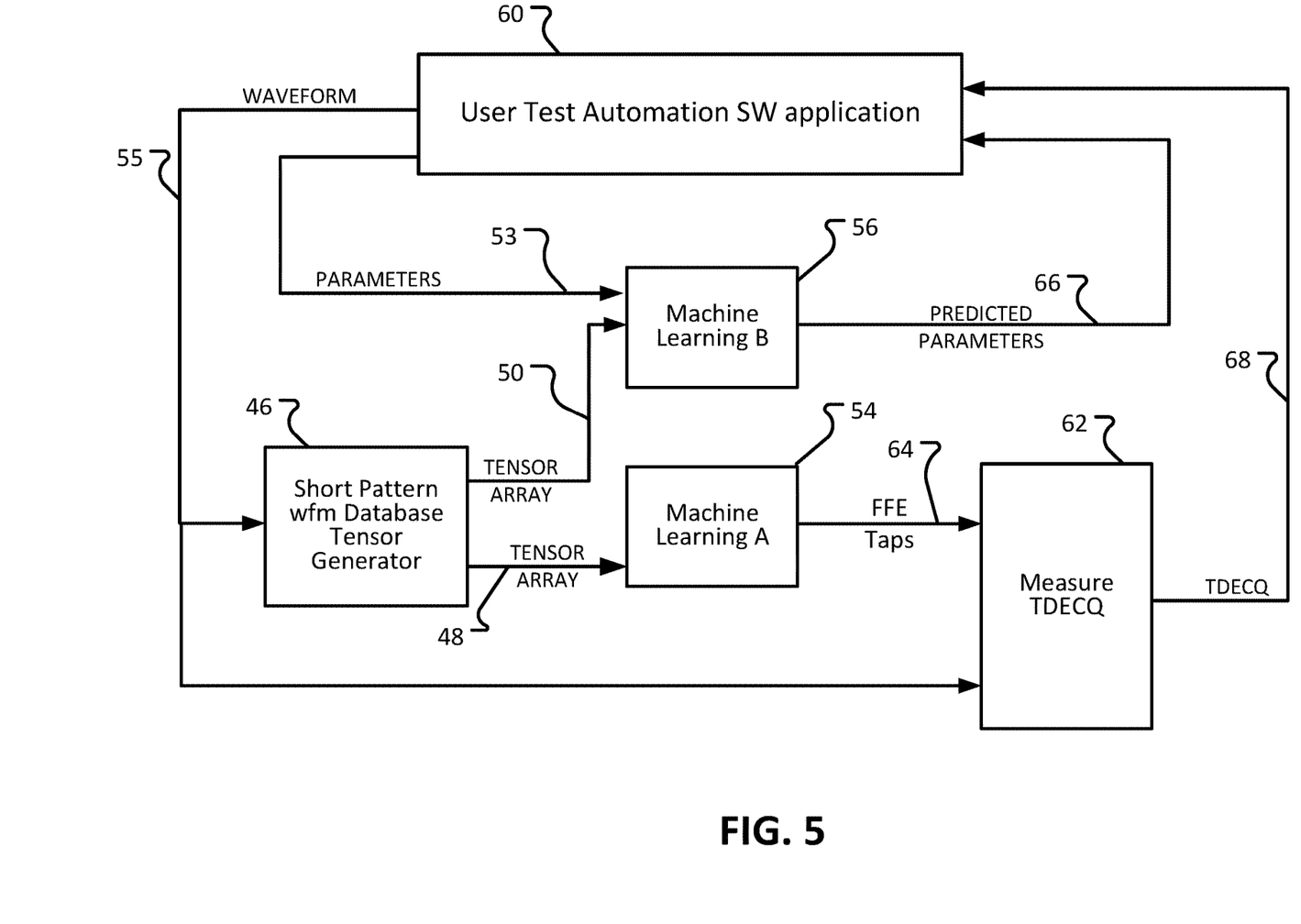
FIG. 5 shows an embodiment of performing TDECQ testing and providing tuning parameters using a two machine learning networks within a test and measurement system.

FIG. 5 shows an embodiment of a runtime configuration using two machine learning networks. Machine A 54 receives the tensor 48 and handles only the FFE taps 64 for the TDECQ process 62. Machine B receives the tensor 50 and the parameters 53 and handles only the predicted parameters 66 as output.

An advantage of this system that combines TDECQ speed up and tuning parameter determination lies in the need for the waveform tensor generator to run only one time. Another advantage results from only needing one trained neural network for both TX tuning and TDECQ observation. This system offers a better-engineered design and a better user experience than using a separate third-party TDECQ measurement requiring separate training procedures for the tuning procedure and the TDECQ measurement.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

EXAMPLES

Illustrative examples of the disclosed technologies are provided below. An embodiment of the technologies may include one or more, and any combination of, the examples described below.

Example 1 is test and measurement system, comprising: a test and measurement instrument; a test automation platform; and one or more processors, the one or more processors configured to execute code that causes the one or more processors to: receive a waveform created by operation of a device under test; generate one or more tensor arrays; apply machine learning to a first tensor array of the one or more tensor arrays to produce equalizer tap values; apply machine learning to a second tensor array of the one of the one or more tensor arrays to produce predicted tuning parameters for the device under test; use the equalizer tap values to produce a Transmitter and Dispersion Eye Closure Quaternary (TDECQ) value; and provide the TDECQ value and the predicted tuning parameters to the test automation platform.

Example 2 is the test and measurement system of Example 1, wherein the first tensor array comprises a plurality of tensor images, each tensor image in the tensor array having one waveform.

Example 3 is the test and measurement system of either of Examples 1 or 2, wherein the second tensor array comprises a plurality of tensor images, each tensor image in the tensor array having three or more waveforms.

Example 4 is the test and measurement system of any of Examples 1 through 3, wherein the code that causes the one or more processors to apply machine learning to the first tensor array and the code that causes the one or more processors to apply machine learning to the second tensor array operates within a same machine learning network.

Example 5 is the test and measurement system of any of Examples 1 through 4, wherein the code that causes the one or more processors to apply machine learning to the first tensor array and the code that causes the one or more processors to apply machine learning to the second tensor array operates in separate machine learning networks for each tensor array.

Example 6 is the test and measurement system of Examples 1 through 5, wherein the one or more processors are further configured to execute code to cause the one or more processors to train one or more machine learning networks, the code to cause the one or more processors to: receive a training waveform; use the training waveform to produce training equalizer tap values; generate one or more training tensor arrays from the training waveform; and provide the one or more training tensor arrays, the training equalizer taps, and tuning parameters associated with the training waveform to the one or more machine learning networks as a training data set.

Example 7 is the test and measurement system of Example 6, wherein the one or more machine learning networks comprises two machine learning networks, a first machine learning network trainable to produce the equalizer tap values and a second machine learning network trainable to produce the predicted tuning parameters.

Example 8 is the test and measurement system of Example 7, wherein the one or more processors are further configured to execute code to cause the one or more processors to train the first machine learning network, the code to cause the one or more processors to: receive a training waveform; use the training waveform to produce training equalizer tap values; generate one training tensor array from the training waveform, each tensor image in the training tensor array having one waveform; and provide the training tensor array, and the training equalizer taps to the first machine learning network as a training data set.

Example 9 is the test and measurement system of Example 7, wherein the one or more processors are further configured to execute code to cause the one or more processors to train the second machine learning network, the code to cause the one or more processors to: receive a training waveform; generate one training tensor array from the training waveform, each tensor image in the training tensor array having three or more waveforms; and provide the training tensor array and tuning parameters associated with the training waveform to the second machine learning network as a training data set.

Example 10 is the test and measurement system of any of Examples 1 through 9, wherein the one or more processors comprise one or more processors that reside in at least one of the test and measurement instrument and the test automation platform.

Example 11 is the test and measurement system of any of Examples 1 through 10, wherein the device under test comprises an optical transceiver or an optical transmitter.

Example 12 is the test and measurement system of Example 11, further comprising a probe comprising an optical fiber to receive an optical signal and an optical to electrical converter to generate an electrical signal from the optical signal, the electrical signal to be converted into the waveform.

Example 13 is a method of testing a device under test, comprising: receiving a waveform created by operation of a device under test; generating one or more tensor arrays; applying machine learning to a first tensor array of the one or more tensor arrays to produce equalizer tap values; applying machine learning to a second tensor array of the one or more tensor arrays to produce predicted tuning parameters for the device under test; using the equalizer tap values to produce a Transmitter Dispersion Eye Closure Quaternary (TDECQ) value; and providing the TDECQ value and the predicted tuning parameters to a test automation platform.

Example 14 is the method of Example 13, wherein the first tensor array comprises a plurality of tensor images, each tensor image in the tensor array having one waveform.

Example 15 is the method of either of Examples 13 or 14, wherein the second tensor array comprises a plurality of tensor images, each tensor image in the tensor array having three waveforms.

Example 16 is the method of any of Examples 13 through 15, wherein the applying machine to the first tensor array and applying machine learning to the second tensor array comprises applying machine learning by one machine learning network.

Example 17 is the method of any of Examples 13 through 15, wherein applying machine learning to the first tensor array comprises applying machine learning using a first machine learning network, and applying machine learning to the second tensor array comprises applying machine learning using a second machine learning network.

Example 18 is the method of any of Examples 13 through 17, further comprising training one or more machine learning networks, the training comprising: receiving a training waveform; using the training waveform to produce training equalizer tap values; generating one or more training tensor arrays from the training waveform; and providing the one or more training tensor arrays, the training equalizer tap values, and tuning parameters associated with the training waveform to the one or more machine learning networks as a training data set.

Example 19 is the method of Example 18, wherein training one or more machine networks comprises training a first machine learning network and a second machine learning network, the training comprising: using the training waveform to produce training equalizer tap values; generating a first training tensor array from the training waveform, each tensor image in the first training tensor array having one waveform image; generating a second training tensor array, each tensor image in the second training tensor array having three or more waveform images; providing the first training tensor array, and the training equalizer taps to the first machine learning network as a training data set; and providing the second training tensor arrays and tuning parameters associated with the training waveform to the second machine learning network as a training data set.

Example 20 is the method of any of Examples 13 through 19, wherein receiving a waveform signal resulting from operation of a DUT comprises receiving an optical signal from the DUT and converting the optical signal into an electrical signal to be converted to the waveform.

Although specific aspects of the disclosure have been illustrated and described for purposes of illustration, it will be understood that various modifications may be made without departing from the spirit and scope of the disclosure. Accordingly, the disclosure should not be limited except as by the appended claims.

We claim:
1. A test and measurement system, comprising:
a test and measurement instrument;
a test automation platform; and
one or more processors, the one or more processors configured to execute code that causes the one or more processors to:
receive a waveform created by operation of a device under test;
generate one or more tensor arrays;
apply machine learning to a first tensor array of the one or more tensor arrays to produce equalizer tap values;
apply machine learning to a second tensor array of the one of the one or more tensor arrays to produce predicted tuning parameters for the device under test;
use the equalizer tap values to produce a Transmitter and Dispersion Eye Closure Quaternary (TDECQ) value; and
provide the TDECQ value and the predicted tuning parameters to the test automation platform.

2. The test and measurement system as claimed in claim 1, wherein the first tensor array comprises a plurality of tensor images, each tensor image in the first tensor array having one waveform.

3. The test and measurement system as claimed in claim 1, wherein the second tensor array comprises a plurality of tensor images, each tensor image in the second tensor array having three or more waveforms.

4. The test and measurement system as claimed in claim 1, wherein the code that causes the one or more processors to apply machine learning to the first tensor array and the code that causes the one or more processors to apply machine learning to the second tensor array operates within a same machine learning network.

5. The test and measurement system as claimed in claim 1, wherein the code that causes the one or more processors to apply machine learning to the first tensor array and the code that causes the one or more processors to apply machine learning to the second tensor array operates in separate machine learning networks for each tensor array.

6. The test and measurement system as claimed in claim 1, wherein the one or more processors are further configured to execute code to cause the one or more processors to train one or more machine learning networks, the code to cause the one or more processors to:
receive a training waveform;
use the training waveform to produce training equalizer tap values;
generate one or more training tensor arrays from the training waveform; and
provide the one or more training tensor arrays, the training equalizer tap values, and tuning parameters associated with the training waveform to the one or more machine learning networks as a training data set.

7. The test and measurement system as claimed in claim 6, wherein the one or more machine learning networks comprises two machine learning networks, a first machine learning network trainable to produce the equalizer tap values and a second machine learning network trainable to produce the predicted tuning parameters.

8. The test and measurement system as claimed in claim 7, wherein the one or more processors are further configured to execute code to cause the one or more processors to train the first machine learning network, the code to cause the one or more processors to:
receive the training waveform;
use the training waveform to produce training equalizer tap values;
generate one training tensor array from the training waveform, wherein the one training tensor array comprises a plurality of tensor images, each tensor image in the training tensor array having one waveform; and
provide the training tensor array and the training equalizer tap values to the first machine learning network as the training data set.

9. The test and measurement system as claimed in claim 7, wherein the one or more processors are further configured to execute code to cause the one or more processors to train the second machine learning network, the code to cause the one or more processors to:
receive the training waveform;
generate one training tensor array from the training waveform, wherein the one training tensor array comprises a plurality of tensor images, each tensor image in the training tensor array having three or more waveforms; and
provide the training tensor array and the tuning parameters associated with the training waveform to the second machine learning network as the training data set.

10. The test and measurement system as claimed in claim 1, wherein the one or more processors comprise one or more processors that reside in at least one of the test and measurement instrument and the test automation platform.

11. The test and measurement system as claimed in claim 1, wherein the device under test comprises an optical transceiver or an optical transmitter.

12. The test and measurement system as claimed in claim 11, further comprising a probe comprising an optical fiber to receive an optical signal and an optical to electrical converter to generate an electrical signal from the optical signal, the electrical signal to be converted into the waveform.

13. A method of testing a device under test (DUT), comprising:
receiving a waveform created by operation of the device under test;
generating one or more tensor arrays;
applying machine learning to a first tensor array of the one or more tensor arrays to produce equalizer tap values;
applying machine learning to a second tensor array of the one or more tensor arrays to produce predicted tuning parameters for the device under test;
using the equalizer tap values to produce a Transmitter Dispersion Eye Closure Quaternary (TDECQ) value; and
providing the TDECQ value and the predicted tuning parameters to a test automation platform.

14. The method as claimed in claim 13, wherein the first tensor array comprises a plurality of tensor images, each tensor image in the first tensor array having one waveform.

15. The method as claimed in claim 13, wherein the second tensor array comprises a plurality of tensor images, each tensor image in the second tensor array having three waveforms.

16. The method as claimed in claim 13, wherein the applying machine learning to the first tensor array and applying machine learning to the second tensor array comprises applying machine learning by one machine learning network.

17. The method as claimed in claim 13, wherein applying machine learning to the first tensor array comprises applying machine learning using a first machine learning network, and applying machine learning to the second tensor array comprises applying machine learning using a second machine learning network.

18. The method as claimed in claim 13, further comprising training one or more machine learning networks, the training comprising:
receiving a training waveform;
using the training waveform to produce training equalizer tap values;
generating one or more training tensor arrays from the training waveform; and
providing the one or more training tensor arrays, the training equalizer tap values, and tuning parameters associated with the training waveform to the one or more machine learning networks as a training data set.

19. The method as claimed in claim 18, wherein training one or more machine networks comprises training a first machine learning network and a second machine learning network, the training comprising:
using the training waveform to produce the training equalizer tap values;

generating a first training tensor array from the training waveform, wherein the first training tensor array comprises a plurality of tensor images, each tensor image in the first training tensor array having one waveform;

generating a second training tensor array, wherein the second training tensor array comprises a plurality of tensor images, each tensor image in the second training tensor array having three or more waveforms;

providing the first training tensor array and the training equalizer tap values to the first machine learning network as the training data set; and providing the second training tensor array and tuning parameters associated with the training waveform to the second machine learning network as the training data set.

20. The method as claimed in claim 13, wherein receiving the waveform resulting from operation of the DUT comprises receiving an optical signal from the DUT and converting the optical signal into an electrical signal to be converted to the waveform.

* * * * *